US009456144B2

(12) United States Patent
Miyazaki

(10) Patent No.: US 9,456,144 B2
(45) Date of Patent: Sep. 27, 2016

(54) IMAGING APPARATUS AND CONTROL METHOD

(71) Applicant: CANON KABUSHIKI KAISHA, Tokyo (JP)

(72) Inventor: Yasuyoshi Miyazaki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/023,753

(22) Filed: Sep. 11, 2013

(65) Prior Publication Data

US 2014/0071315 A1 Mar. 13, 2014

(30) Foreign Application Priority Data

Sep. 13, 2012 (JP) .................................. 2012-201709

(51) Int. Cl.
H04N 5/235 (2006.01)

(52) U.S. Cl.
CPC ............ *H04N 5/2354* (2013.01); *H04N 5/235* (2013.01)

(58) Field of Classification Search
USPC ................................................. 348/370, 371
See application file for complete search history.

(56) References Cited

U.S. PATENT DOCUMENTS

| 6,654,062 | B1 | 11/2003 | Numata |
| 2002/0048457 | A1 | 4/2002 | Matsui |
| 2007/0025720 | A1* | 2/2007 | Raskar et al. ............... 396/213 |
| 2008/0024655 | A1 | 1/2008 | Maeda |
| 2009/0040364 | A1 | 2/2009 | Rubner |
| 2010/0165181 | A1* | 7/2010 | Murakami et al. ........... 348/371 |
| 2011/0200259 | A1* | 8/2011 | Lindskog et al. ............ 382/201 |
| 2011/0298947 | A1* | 12/2011 | Guo et al. .................. 348/224.1 |
| 2012/0044379 | A1 | 2/2012 | Manabe |
| 2012/0105681 | A1 | 5/2012 | Morales |
| 2012/0112658 | A1* | 5/2012 | Hauser et al. ................ 315/294 |
| 2012/0188432 | A1* | 7/2012 | Kubota .................... 348/333.01 |

FOREIGN PATENT DOCUMENTS

| EP | 1318668 A2 | 6/2003 |
| EP | 2466873 A1 | 6/2012 |
| JP | H10-032750 A | 2/1998 |
| JP | 2004-056257 A | 2/2004 |
| JP | 2006-091108 A | 4/2006 |
| JP | 2007-124292 A | 5/2007 |
| JP | 2007311896 A | 11/2007 |
| JP | 2007318534 A | 12/2007 |
| JP | 2008092175 A | 4/2008 |
| JP | 2011-097345 A | 5/2011 |
| JP | 2011-164244 A | 8/2011 |
| JP | 2012044378 A | 3/2012 |
| RU | 2436160 C2 | 12/2011 |

\* cited by examiner

*Primary Examiner* — Mark Monk
(74) *Attorney, Agent, or Firm* — Canon USA, Inc. IP Division

(57) ABSTRACT

A determination unit determines exposure control values for a light emission shooting operation and a non-light emission shooting operation based on information acquired by an acquisition unit about a brightness of an object a preliminary light emission is performed by the light emitting device.

16 Claims, 8 Drawing Sheets

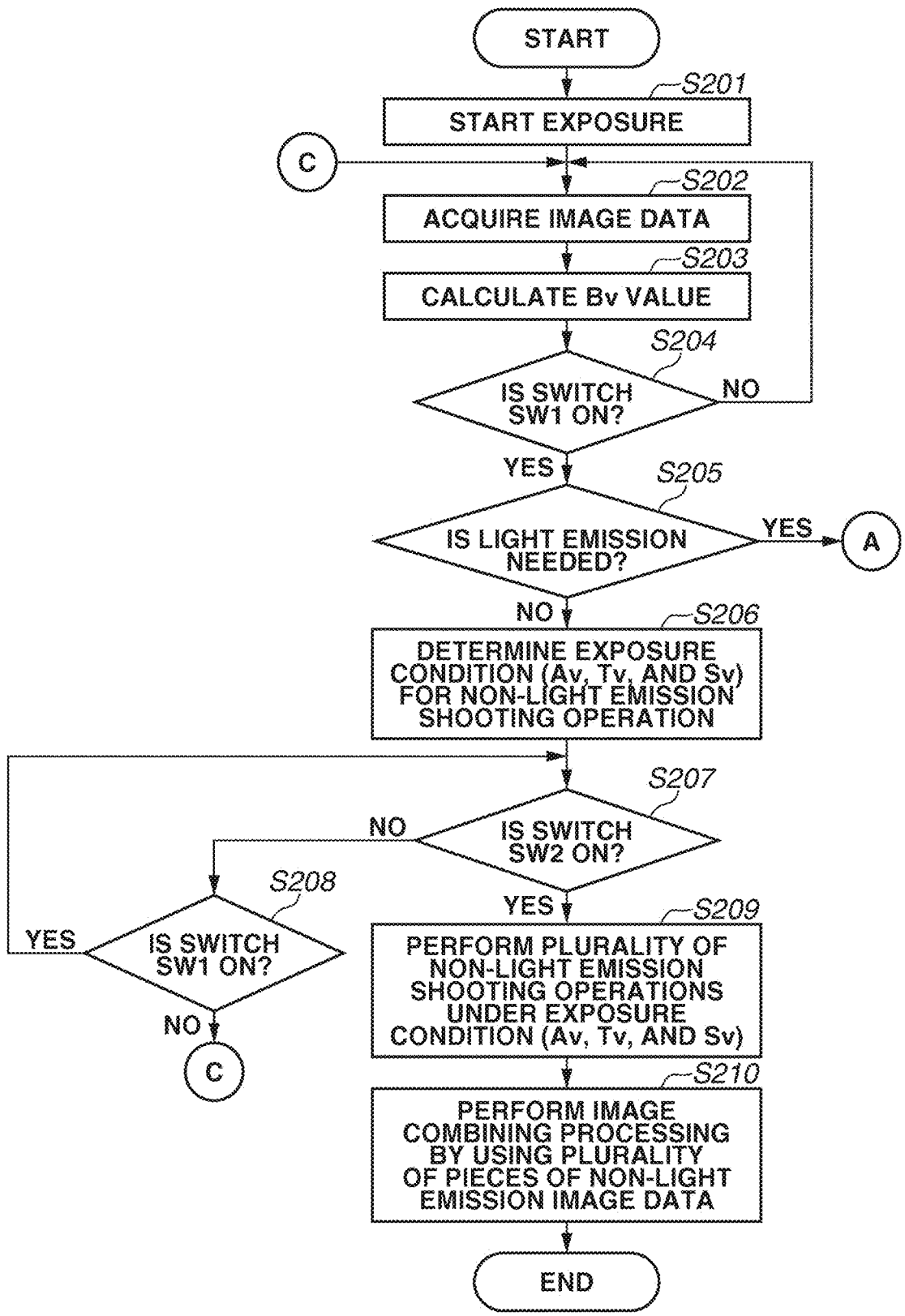

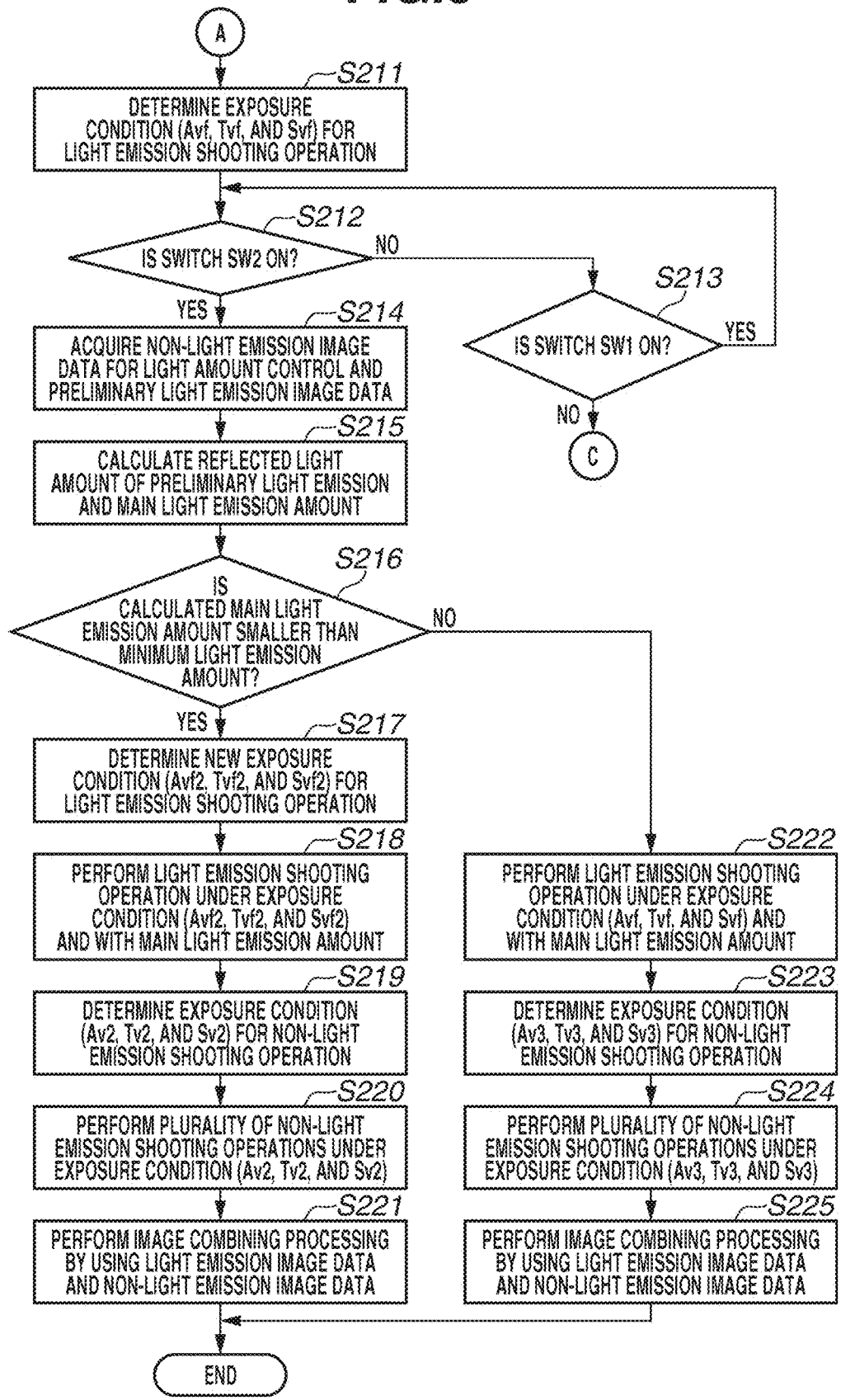

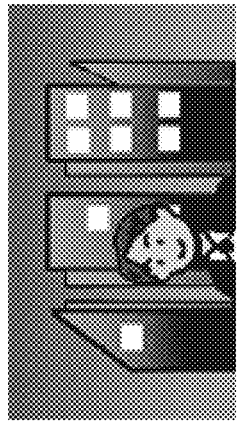
FIG.4A IMAGE OBTAINED BY PERFORMING LOW-SENSITIVITY LIGHT EMISSION SHOOTING OPERATION
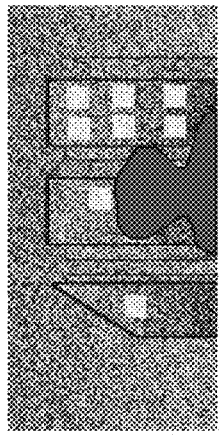
FIG.4B IMAGE OBTAINED BY PERFORMING HIGH-SENSITIVITY NON-LIGHT EMISSION SHOOTING OPERATION
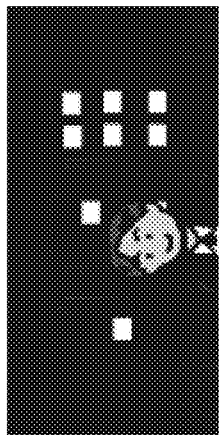
FIG.4C COMPOSITE IMAGE

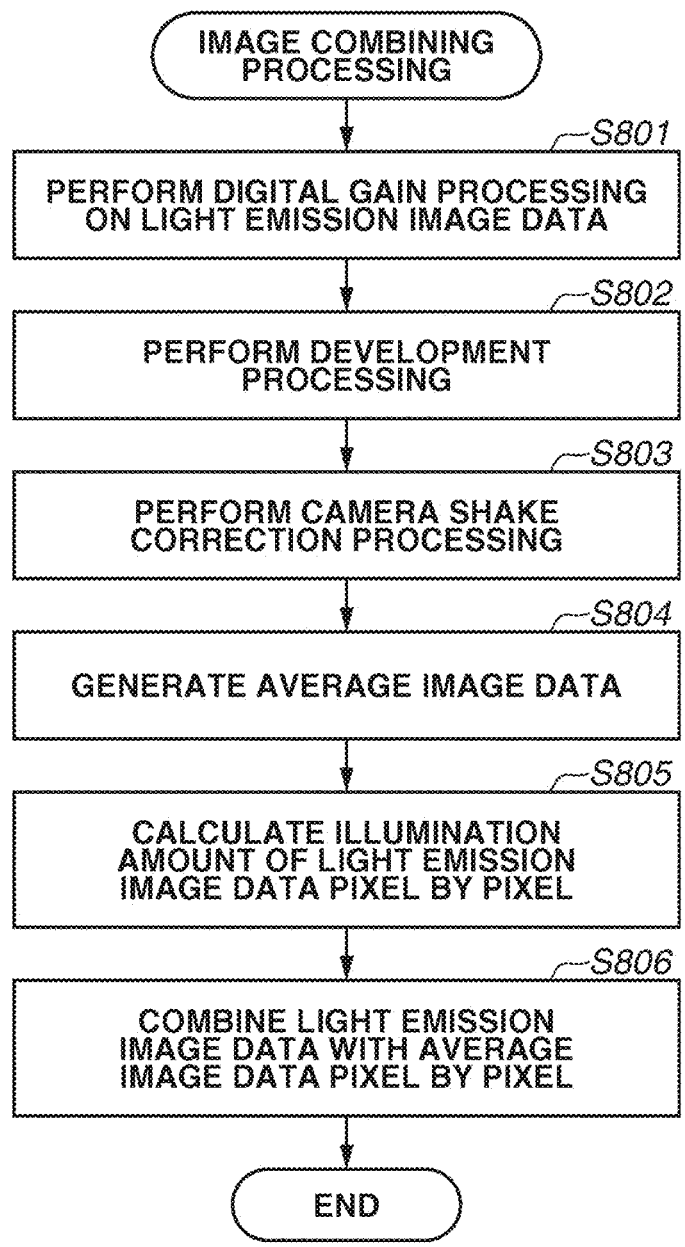

1

IMAGING APPARATUS AND CONTROL METHOD

BACKGROUND OF THE INVENTION

1. Field of the Invention

The present invention relates to an imaging apparatus that performs a plurality of shooting operations to acquire a plurality of pieces of image data to be used for image composition, and a method for controlling the same.

2. Description of the Related Art

Imaging apparatuses such as a digital camera may perform a shooting operation with high sensitivity to suppress camera shakes when photographing a nightscape in a handheld manner. The imaging apparatuses have conventionally had a problem of increased noise in such high-sensitivity shooting operations. Japanese Patent Application Laid-Open No. 2007-124292 discusses a technique for combining image data acquired by performing a shooting operation with low sensitivity while causing a flash to emit light and image data acquired by performing a shooting operation with high sensitivity without causing the flash to emit light. The technique includes determining a combining ratio pixel by pixel. The greater brightness value a pixel of image data acquired by performing a shooting operation while causing the flash to emit light has, the higher the ratio of the image data acquired by performing the shooting operation while causing the flash to emit light is made.

According to the technique discussed in Japanese Patent Application Laid-Open No. 2007-124292, an exposure condition for performing a shooting operation while causing the flash to emit light and an exposure condition for performing a shooting operation without causing the flash to emit light are not appropriately set so that a favorable composite image can be obtained.

SUMMARY OF THE INVENTION

The present invention is directed to an imaging apparatus that can obtain a favorable composite image by combining image data acquired by performing a shooting operation while causing a light emitting device to emit light and image data acquired by performing a shooting operation without causing the light emitting device to emit light.

According to an aspect of the present invention, an imaging apparatus includes an imaging unit configured to capture an image of an object to output image data, an acquisition unit configured to acquire information about a brightness of the object, and a determination unit configured to determine an exposure control value to be used in a shooting operation based on the information acquired by the acquisition unit about the brightness of the object, wherein the imaging unit is configured to obtain a plurality of image data, for image combining processing, by performing a plurality of shooting operations including a light emission shooting operation performed while causing a light emitting device to emit light and a non-light emission shooting operation performed without causing the light emitting device to emit light, and wherein the determination unit is configured to determine exposure control values for the light emission shooting operation and the non-light emission shooting operation based on the information acquired by the acquisition unit about the brightness of the object from a preliminary light emission performed by the light emitting device.

Further features of the present invention will become apparent from the following description of exemplary embodiments with reference to the attached drawings.

BRIEF DESCRIPTION OF THE DRAWINGS

FIG. 2 is a flowchart illustrating various types of processing for obtaining a composite image.

FIG. 3 is a flowchart illustrating various types of processing for obtaining a composite image.

FIGS. 4A, 4B, and 4C are diagrams illustrating images obtained in a portrait shooting scene with a nightscape in the background. FIG. 4A is a diagram illustrating an image obtained by performing a shooting operation while causing a light emitting device to emit light. FIG. 4B is a diagram illustrating an image obtained by performing a shooting operation without causing the light emitting device emit light. FIG. 4C is a diagram illustrating a composite image of the images illustrated in FIGS. 4A and 4B.

FIG. 8 is a flowchart illustrating processing related to the image combining processing.

DESCRIPTION OF THE EMBODIMENTS

Various exemplary embodiments, features, and aspects of the invention will be described in detail below with reference to the drawings.

Figure 1:
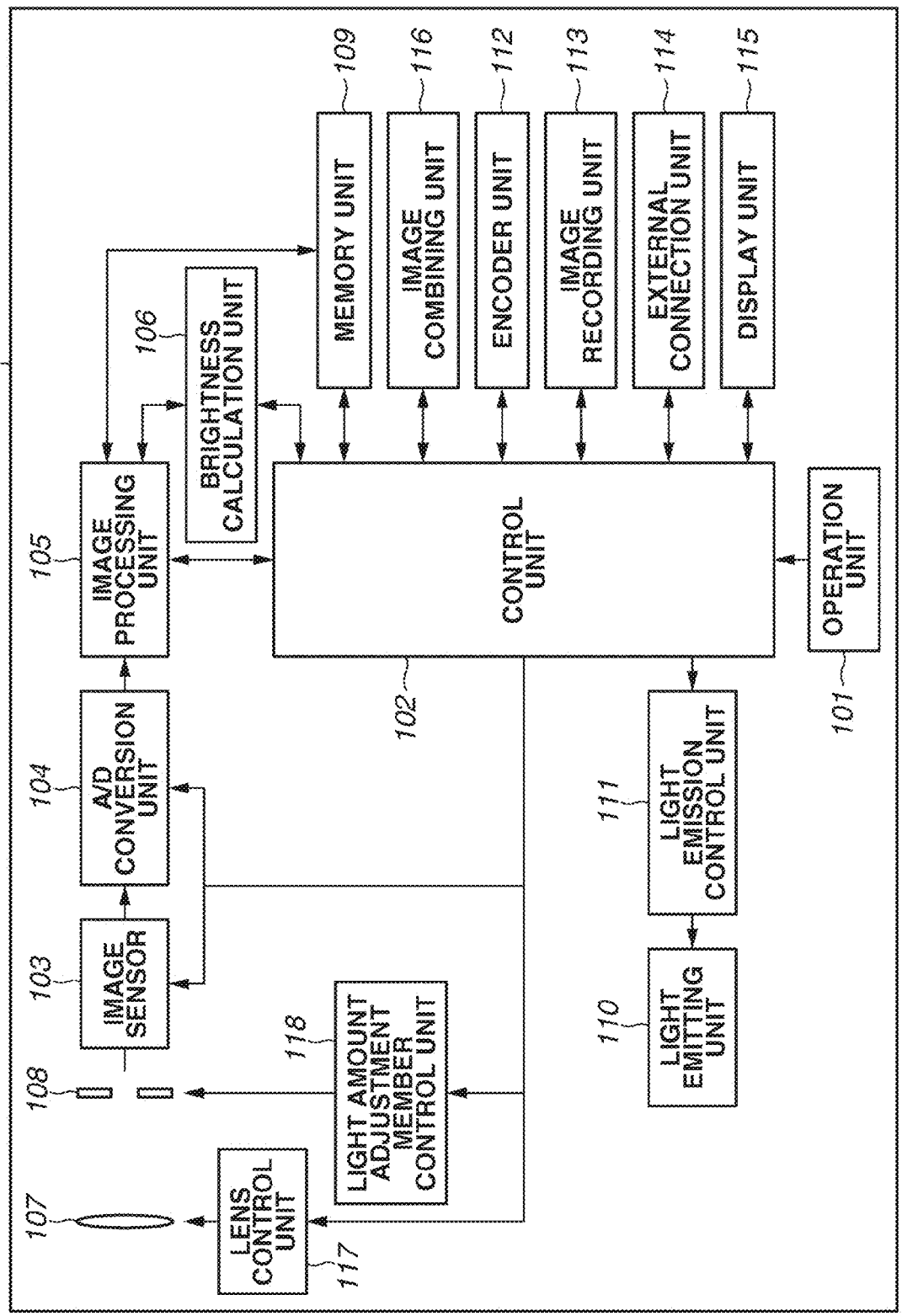
FIG. 1 is a block diagram illustrating a configuration of an imaging apparatus according an exemplary embodiment.

FIG. 1 is a block diagram illustrating a configuration of a camera 100, which is an imaging apparatus according to an exemplary embodiment of the present invention.

An operation unit 101 includes a switch and a button, which a user operates to input various instructions to the camera 100. The operation unit 101 includes a shutter switch for inputting an instruction to start a shooting preparation operation and an instruction to start a shooting operation, a mode dial for selecting a desired photographing mode from a plurality of photographing modes, and a touch sensor arranged on the front surface of a display unit 115 to be described below.

A control unit 102 controls an overall operation of the camera 100. The control unit 102 controls various components according to instructions from the operation unit 101.

An image sensor 103 is a charge-coupled device (CCD) or complementary metal-oxide semiconductor (CMOS) sensor. The image sensor 103 receives light that is incident through a lens 107 and a light amount adjustment member 108, and outputs image data according to the amount of light received.

An analog-to-digital (A/D) conversion unit 104 performs sampling, again adjustment, and A/D conversion on the analog image data output from the image sensor 103, and outputs the resulting image data as digital image data. The gain adjustment of the A/D conversion unit 104 corresponds to changing a capturing sensitivity.

An image processing unit 105 performs various types of image processing on the digital image data output from the A/D conversion unit 104, and outputs the processed image data.

A brightness calculation unit 106 calculates a brightness value (Bv value) to acquire information about the brightness of an object based on the image data output from the image processing unit 105.

The lens 107 is a lens unit including a plurality of lenses such as a focus lens and a zoom lens.

The light amount adjustment member 108 is a member that adjusts the amount of light incident on the image sensor 103 through the lens 107. Examples include a diaphragm which changes an aperture diameter to adjust the amount of light to pass through an aperture, a beam attenuation filter which reduces the amount of passing light, and a shutter which switches a state of the image sensor 103 between an exposed state and a light-shielded state.

A memory unit 109 temporarily stores the image data output from the image processing unit 105. As will be describe below, the memory unit 109 temporarily stores a plurality of pieces of image data to be used for image combining processing.

A light emitting unit 110 irradiates the object with auxiliary light by using a xenon tube or a light-emitting diode (LED) as a light source. A light emission control unit 111 performs light emission control on the light emitting unit 110 based on the user's instruction and/or the brightness value calculated by the brightness calculation unit 106.

An encoder unit 112 converts a format of the image data output from the image processing unit 105 and/or an image combining unit 116 into a format such as Joint Photographic Experts Group (JPEG). The encoder unit 112 outputs the resulting image data to an image recording unit 113. The image recording unit 113 performs processing for recording the format-converted image data output from the encoder unit 112 on a not-illustrated recording medium in the camera 100 or an external recording medium inserted in the camera 100. An external connection unit 114 is intended to connect the camera 100 with an external device in a wired or wireless manner. The format-converted image data output from the encoder unit 112 can be transmitted to an external device via the external connection unit 114.

A display unit 115 includes a liquid crystal or organic electroluminescent (EL) device. The display unit 115 displays an image based on the image data output from the image processing unit 105.

The image combining unit 116 performs the image combining processing by using a plurality of pieces of image data output from the image processing unit 105, thereby generating composite image data.

The image combining processing in the portrait shooting scene with a nightscape in the background will be described.

FIGS. 4A, 4B, and 4C are diagrams illustrating images obtained in the portrait shooting scene with a nightscape in the background. A shooting operation may be performed by making the capturing sensitivity relatively low as will be described below and causing the light emitting unit 110 to emit light so that a person has correct brightness. Image data acquired by such a shooting operation will be referred to as light emission image data. FIG. 4A illustrates an example of an image (hereinafter, referred to as light emission image) based on the light emission image data. A shooting operation may be performed without causing the light emitting unit 110 to emit light and by making the capturing sensitivity relatively higher than when a shooting operation is performed while causing the light emitting unit 110 to emit light. Image data acquired by such a shooting operation will be referred to non-light emission image data. FIG. 4B illustrates an example of an image (hereinafter, referred to as non-light emission image) based on the non-light emission image data. FIG. 4C illustrates an example of a composite image based on composite image data generated by combining the light emission image data with the non-light emission image data.

To obtain a non-light emission image with a bright background as illustrated in FIG. 4B, the capturing sensitivity is set to be relatively higher than when the light emitting unit 110 is caused to emit light for a shooting operation. The higher capturing sensitivity increases the effect of noise on the non-light emission image data as compared to that on the light emission image data. The image combining unit 116 then arithmetically averages and combines a plurality of pieces of non-light emission image data acquired by performing a plurality of shooting operations without causing the light emitting unit 110 to emit light. The image combining unit 116 thereby generates non-light emission composite image data. Arithmetically averaging and combining the plurality of pieces of non-light emission image data can reduce the effect of noise on the non-light emission composite image data. When obtaining a composite image such as illustrated in FIG. 4C, the image combining unit 116 can use the foregoing non-light emission composite image data instead of a single piece of non-light emission image data to reduce the effect of noise of the non-light emission image data. The effect of noise may sometimes remain at an acceptable level even if the capturing sensitivity is made relatively high. In such a case, the image combining unit 116 need not acquire a plurality of pieces of non-light emission image data by performing a plurality of shooting operations without causing the light emitting unit 110 to emit light, or generate non-light emission composite image data. The image combining unit 116 may use a single piece of non-light emission image data for the image combining processing.

The image combining unit 116 generates the composite image data based on the generated non-light emission composite image data and the light emission image data. For a person area, the image combining unit 116 uses the light emission image data by priority. For a background area, the image combining unit 116 uses the non-light emission composite image data by priority. Using the light emission image data by priority means that the image combining unit 116 combines a higher ratio of the light emission image data with a lower ratio of the non-light emission composite image data. Using only the light emission image data without the non-light emission composite image data is also included.

By generating the composite image data as described above, the image combining unit 116 can obtain an image like illustrated in FIG. 4C, where the background and the person are bright without much effect of noise or camera shakes.

A lens control unit 117 drives the lens 107 to make a focus adjustment based on the user's instruction and/or the image data output from the image processing unit 105.

A light amount adjustment member control unit 118 controls the light amount adjustment member 108 based on the user's instruction and/or the brightness value calculated by the brightness calculation unit 106.

Next, operations related to a shooting operation will be described. The user turns on a power switch included in the operation unit 101. The control unit 102 detects the turning-on, and supplies power to the components constituting the cameral 100. With the power supplied to the components of the camera 100, a shutter opens and light is incident on the image sensor 103 through the lens 107 and the light amount adjustment member 108. The control unit 102 then causes the image sensor 103 to output analog image data at predetermined cycles.

If the user operates the shutter switch to input an instruction to start the shooting preparation operation (a switch SW1 is turned on), the control unit 102 starts the shooting preparation operation by using the image data output from the image processing unit 105. For example, the shooting preparation operation includes focus adjustment processing, exposure condition determination processing, and light emission determination processing of the light emitting unit 110.

In the light emission determination processing, the control unit 102 may determine that no light emission is needed (the light emitting unit 110 is not to emit light). In such a case, the control unit 102 enters a main shooting operation when the user operates the shutter switch to input an instruction to start a shooting operation (a switch SW2 is turned on). In the main shooting operation, the control unit 102 performs exposure control based on a result of the exposure condition determination processing performed in the shooting preparation operation.

The control unit 102 may determine that light emission is needed (the light emitting unit 110 is to emit light). In such a case, the control unit 102 acquires non-light emission image data (non-light emission image data for light amount control) to be used to determine a light emission amount of the light emitting unit 110 when the switch SW2 is turned on. The control unit 102 then causes the light emitting unit 110 to perform preliminary light emission and acquires preliminary light emission image data. The control unit 102 compares the non-light emission image data for light amount control with the preliminary light emission image data, and determines a main light emission amount needed for a main shooting operation. In the main shooting operation, the control unit 102 performs exposure control based on the result of the exposure condition determination processing performed in the shooting preparation operation, and causes the light emitting unit 110 to emit light as much as the main light emission amount determined as described above.

Next, the foregoing processing for obtaining a composite image will be described in detail with reference to FIGS. 2 and 3. FIGS. 2 and 3 are flowcharts illustrating various types of processing for obtaining a composite image. FIG. 2 deals with a case where the user has previously operated the mode dial to select an image combining photographing mode in which the image combining processing is performed by using image data acquired by performing a plurality of shooting operations.

The user turns on the power switch included in the operation unit 101. In step S201, the control unit 102 opens the shutter to expose the image sensor 103. If the control unit 102 performs step S201 immediately after the power switch is turned on, the control unit 102 sets predetermined initial values as an exposure condition. From the second time, the control unit 102 sets an exposure condition based on a brightness value calculated in step S203 to be described below.

In step S202, the control unit 102 performs charge accumulation of the image sensor 103 based on the set exposure condition and then causes the image sensor 103 to output analog image data. The control unit 102 thereby acquires the image data.

In step S203, the brightness calculation unit 106 calculates a brightness value (Bv value) based on the image data acquired in step S202. The brightness calculation unit 106 may calculate the brightness value by using a conventional method. A detailed description thereof is omitted. The present exemplary embodiment deals with a case where the brightness calculation unit 106 divides the image data into a plurality of blocks, calculates a brightness value in each block, and averages the calculated brightness values of the respective blocks to determine an average brightness value. The average brightness value is used as the brightness value in step S203.

In step S204, the control unit 102 determines whether the switch SW1 is on. The control unit 102 and the brightness calculation unit 106 repeat the processing of steps S202 to S204 until the switch SW1 is turned on.

In step S204, if the control unit 102 determines that the switch SW1 is on (YES in step S204), then in step S205, the control unit 102 performs the light emission determination processing of the light emitting unit 110 based on the brightness value calculated in step S203.

In the light emission determination processing of step S205, if light emission is determined to be not needed (NO in step S205), then in step S206, the control unit 102 determines an exposure configuration for a non-light emission shooting operation (shooting operation without causing the light emitting unit 110 to emit light) based on the brightness value calculated in step S203. Specifically, the control unit 102 determines exposure control values including an aperture value Av of the diaphragm to be used in the non-light emission shooting operation, a shutter speed Tv corresponding to a charge accumulation time of the image sensor 103, and a capturing sensitivity Sv. The control unit 102 may determine the exposure control values by using a conventional method. For example, a program diagram associating brightness values with exposure control values may be stored in advance. According to the stored program diagram, the control unit 102 may determine exposure control values based on the brightness value calculated in step S203.

In step S207, the control unit 102 determines whether the switch SW2 is on. If the control unit 102 determines that the switch SW2 is on (YES in step S207), the control unit 102 proceeds to step S209. If the control unit 102 determines that the switch SW2 is not on (NO in step S207), then in step S208, the control unit 102 determines whether the switch SW1 is on. If the control unit 102 determines that the switch SW1 is not on (NO in step S208), the control unit 102 proceeds to step S202. If the control unit 102 determines that the switch SW1 is on (YES in step S208), the control unit 102 proceeds to step S207.

In step S209, the control unit 102 performs a plurality (for example, three) of non-light emission shooting operations in succession under the exposure condition determined in step S206.

In step S210, the image combining unit 116 performs the image combining processing by using a plurality of pieces of non-light emission image data acquired by performing the plurality of pieces of non-light emission shooting operations. The image combining unit 116 thereby generates composite image data.

In the light emission determination processing of step S205, if light emission is determined to be needed (YES in step S205), then in step S211 of FIG. 3, the control unit 102 determines an exposure condition for a light emission shooting operation (shooting operation performed while causing the light emitting unit 110 to emit light) based on the brightness value calculated in step S203. Specifically, the control unit 102 determines exposure control values including an aperture value Avf of the diaphragm used in the light emission shooting operation, a shutter speed Tvf corresponding to the charge accumulation time of the image sensor 103, and a capturing sensitivity Svf.

In step S212, the control unit 102 determines whether the switch SW2 is on. If the control unit 102 determines that the switch SW2 is on (YES in step S212), the control unit 102 proceeds to step S214. If the control unit 102 determines that the switch SW2 is not on (NO in step S212), then in step S213, the control unit 102 determines whether the switch SW1 is on. If the control unit 102 determines that the switch SW1 is not on (NO in step S213), the control unit 102 proceeds to step S202. If the control unit 102 determines that the switch SW1 is on (YES in step S213), the control unit 102 proceeds to step S212.

In step S214, to determine the light emission amount of the light emitting unit 110, the control unit 102 successively performs a non-light emission shooting operation and a light emission shooting operation to acquire non-light emission image data for light amount control and preliminary light emission image data. The present exemplary embodiment deals with a case where the control unit 102 performs the non-light emission shooting operation and the light emission shooting operation by using predetermined exposure conditions and a predetermined preliminary light emission amount. The exposure condition for the non-light emission shooting operation and the exposure condition for the light emission shooting operation are the same. The preliminary light emission amount is sufficiently smaller than a controllable maximum light emission amount of the light emission unit 110. In the non-light emission shooting operation and the light emission shooting operation performed in step S214, the control unit 102 may set the exposure conditions and the preliminary light emission amount based on the brightness value calculated in step S203.

In step S215, the control unit 102 calculates a reflected light amount of the preliminary light emission from a result of comparison between the acquired non-light emission image data for light amount control and preliminary light emission image data. Specifically, the brightness calculation unit 106 calculates the brightness values of the preliminary light emission image data and the non-light emission image data for light amount control, and the control unit 102 calculates a difference between the brightness values. The difference in the brightness value corresponds to an increase of the brightness value by the preliminary light emission, i.e., the reflected light amount of the preliminary light emission. Note that the brightness calculation unit 106 can divide image data into a plurality of blocks and calculates the brightness values of the respective blocks. When calculating the reflected light amount of the preliminary light emission, the control unit 102 can use the brightness values of blocks in which the brightness values of the preliminary light emission image data and the non-light emission image data for light amount control vary by more than a predetermined value. For example, the control unit 102 may calculate average brightness values of such blocks of the preliminary light emission image data and the non-light emission image data for light amount control, respectively, where the brightness values of the preliminary light emission image data and the non-light emission image data for light amount control vary by more than a predetermined amount. The control unit 102 can then calculate a difference between the calculated average brightness values. In some blocks, the brightness values may not vary much with the preliminary light emission. If the control unit 102 calculates the average brightness value of the preliminary light emission image data by including the brightness values of such blocks, the average brightness value becomes smaller than when calculated from only the brightness values of blocks where the brightness values vary largely with the preliminary light emission. This reduces the difference between the average brightness values of the preliminary light emission image data and the non-light emission image data for light amount control as compared to when using the average brightness value calculated from only the brightness values of the blocks where the brightness values vary largely with the preliminary light emission. In such a case, the calculated reflected light amount of the preliminary light emission becomes smaller than an actual amount.

As described above, the control unit 102 calculates the reflected light amount of the preliminary light emission based on the brightness values of blocks where the brightness values vary largely with the preliminary light emission. As a result, the control unit 102 can accurately calculate the reflected light amount of the preliminary light emission.

Figure 5:
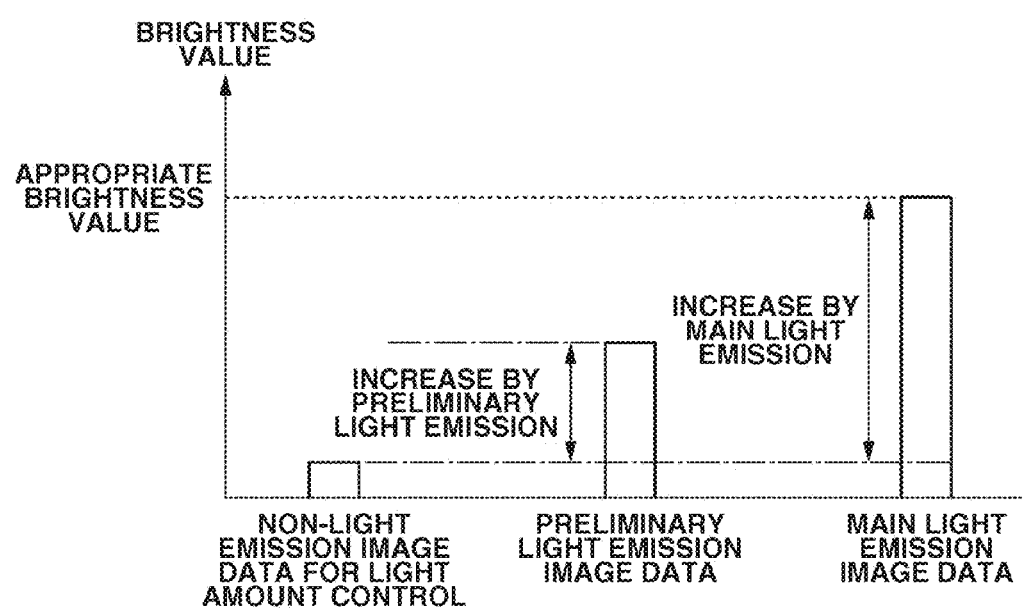
FIG. 5 is a diagram illustrating a main light emission amount when a reflected light amount of preliminary light emission of the light emitting device is small.
Figure 6:
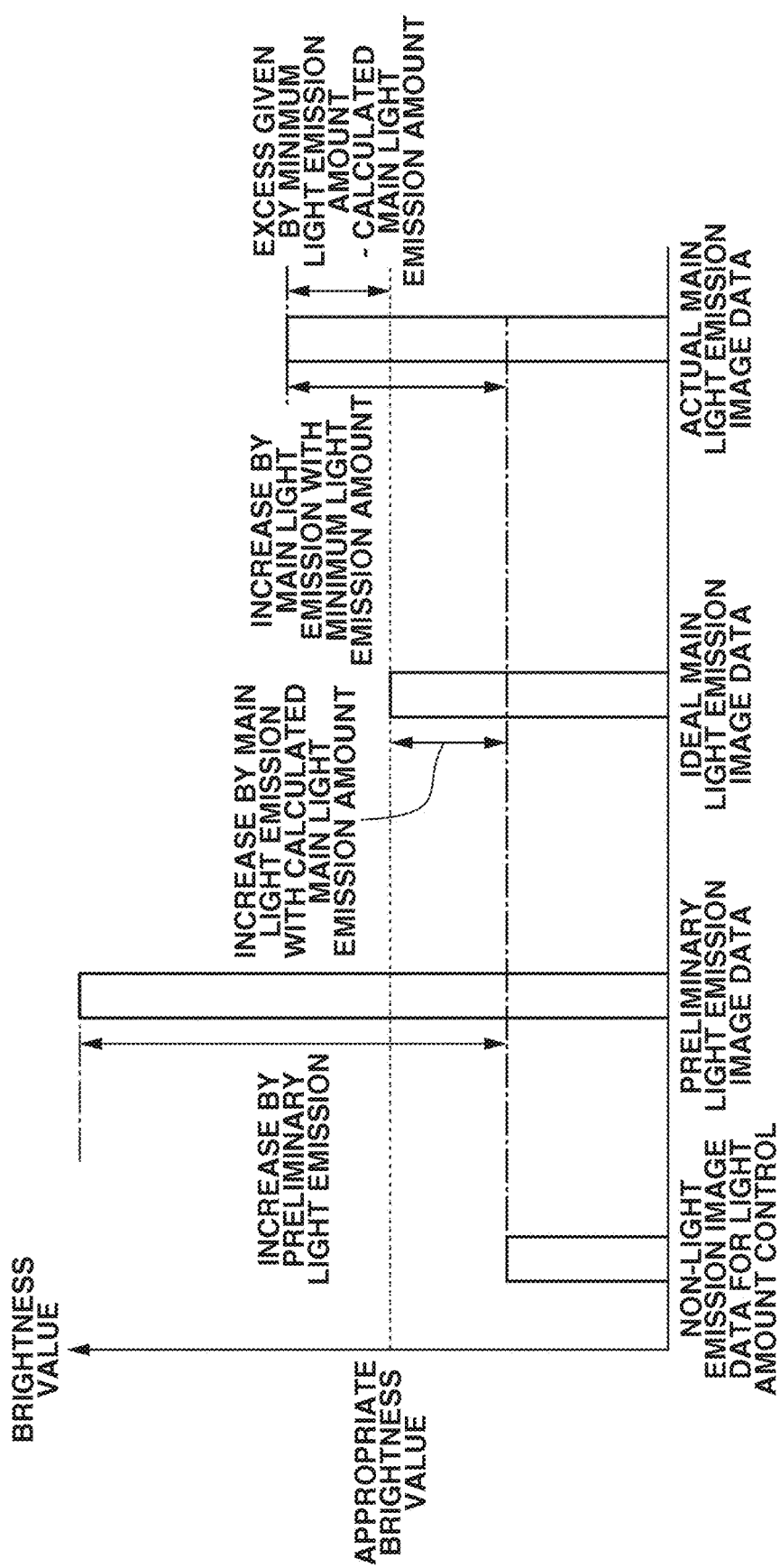
FIG. 6 is a diagram illustrating the main light emission amount when the reflected light amount of the preliminary light emission of the light emitting device is large.

In step S215, the control unit 102 further determines a main light emission amount under the exposure condition determined in step S211 based on the calculated reflected light amount of the preliminary light emission. A relationship between the reflected light amount of the preliminary light emission and the main light emission amount will be described with reference to FIGS. 5 and 6. FIG. 5 is a diagram illustrating the main light emission amount when the reflected light amount of the preliminary light emission is small. FIG. 6 is a diagram illustrating the main light emission amount when the reflected light amount of the preliminary light emission is large. The exposure conditions under which the shooting operations for calculating the reflected light amount of the preliminary light emission are performed may be different from the exposure condition for a light emission shooting operation determined in step S211. In the following description, the control unit 102 calculates the main light emission amount in consideration of such a difference between the exposure conditions. The brightness values illustrated in FIGS. 5 and 6 are the average brightness values of blocks where the brightness values of the preliminary light emission image data and the non-light emission image data for light amount control vary by more than a predetermined value.

FIG. 5 illustrates the case where the brightness value calculated from the preliminary light emission image data is small (the reflected light amount of the preliminary light emission is small). To set the brightness value of main light emission image data to an appropriate brightness value, the main light emission amount needs to produce a large increase in brightness. As described above, the preliminary light emission amount is sufficiently smaller than the maximum light emission amount of the light emitting unit 110. The appropriate brightness value is thus likely to be achievable by making the main light emission amount greater than the preliminary light emission amount.

FIG. 6 illustrates the case where the brightness value calculated from the preliminary light emission image data is large (the reflected light amount of the preliminary light emission is large). To set the brightness value of the main light emission image data to the appropriate brightness value, the main light emission amount has only to produce a small increase in brightness. If the light emitting unit 110 can emit light as much as the light emission amount needed to set the brightness value of the main light emission image data to the appropriate brightness value, there will be no problem. However, the light emission amount needed to set the brightness value of the main light emission image data to the appropriate brightness value may sometimes be smaller than a controllable minimum light emission amount of the light emitting unit 110. In such a case, the brightness value of the main light emission image data exceeds the appropriate brightness value by an excess of the light emission amount. For example, in the portrait shooting scene illustrated in FIG. 4 with a nightscape in the background, the person can be overexposed.

To suppress overexposure of the object and obtain a favorable composite image without uncomfortable feeling, the control unit 102 performs the processing of step S216 and subsequent steps.

In step S216, the control unit 102 determines whether the main light emission amount calculated in step S215 is smaller than the minimum light emission amount of the light emitting unit 110.

If the main light emission amount calculated in step S215 is smaller than the minimum light emission amount (YES in step S216), then in step S217, the control unit 102 determines a new exposure condition for a light emission shooting operation. In step S217, the control unit 102 determines new exposure control values including an aperture value Avf2, shutter speed Tvf2, and capturing sensitivity Svf2 so that the new exposure condition results in underexposure as compared to the exposure condition determined in step S211. The aperture value Avf2, shutter speed Tvf2, and capturing sensitivity Svf2 need not be all different from the exposure control values determined in step S211, but at least one needs to be different. In step S217, the control unit 102 determines the new exposure control values based on the exposure control values determined in step S211 and a difference between the main light emission amount calculated in step S215 and the minimum light emission amount of the light emitting unit 110. For example, the control unit 102 determines the exposure control values so that the average brightness value of blocks where the brightness values of the preliminary light emission image data and the non-light emission image data for light amount control vary by more than a predetermined value becomes the appropriate brightness value if the light emitting unit 110 emits light as much as a light emission amount greater than or equal to the minimum light emission amount. When determining the new exposure control values, the control unit 102 also determines a new main light emission amount of the light emitting unit 110. The present exemplary embodiment deals with a case where the control unit 102 sets the new main light emission amount to the minimum light emission amount. The control unit 102 makes the new capturing sensitivity Svf2 lower than the capturing sensitivity Svf so that the average brightness value of blocks where the brightness values vary by more than a predetermined amount becomes the appropriate brightness value when the light emitting unit 110 emits light as much as the minimum light emission amount.

In step S218, the control unit 102 performs a light emission shooting operation under the exposure condition and with the main light emission amount determined in step S217. Since the new exposure condition for the light emission shooting operation is determined based on the preliminary light emission image data and the non-light emission image data for light amount control, overexposure of the object can be suppressed.

In step S219, the control unit 102 determines an exposure condition for a non-light emission shooting operation based on the exposure condition determined in step S217. As described above, to acquire a non-light emission image with a bright background, the control unit 102 increases the capturing sensitivity for the non-light emission shooting operation as compared to the capturing sensitivity for the light emission shooting operation. More specifically, the control unit 102 sets a capturing sensitivity Sv2 for the non-light emission shooting operation to be relatively higher than the capturing sensitivity Svf2 for the light emission shooting operation. To obtain a favorable composite image without uncomfortable feeling, the other exposure control values for the non-light emission shooting operation, namely, an aperture value Avg and a shutter speed Tv2 can be made the same as the aperture value Avf2 and the shutter speed Tvf2 for the light emission shooting operation. The control unit 102 may determine the exposure control values including the capturing sensitivity Sv2 according to a previously stored program diagram such that exposure in a non-light emission shooting operation becomes brighter than exposure in a light emission shooting operation. The present exemplary embodiment deals with a case where the control unit 102 sets the aperture value Avg to be the same as the aperture value Avf2, sets the shutter speed Tv2 to be the same as the shutter speed Tvf2, and sets the capturing sensitivity Sv2 to be one level higher than the capturing sensitivity Svf2.

The control unit 102 may determine the difference between the capturing sensitivity Sv2 for the non-light emission shooting operation and the capturing sensitivity Svf2 for the light emission shooting operation based on a difference in noise between the preliminary light emission image data and the non-light emission image data for light amount control. The capturing sensitivity Sv2 may be two or more levels higher if the difference in noise between the preliminary light emission image data and the non-light emission image data for light amount control is small.

As described above, the image combining unit 116 can combine pieces of non-light emission image data to generate non-light emission composite image data. This can reduce the effect of noise even if non-light emission shooting operations are performed with an increased capturing sensitivity. The greater the number of pieces of non-light emission image data, the more the effect of noise can be reduced. The control unit 102 may thus set an exposure difference between a non-light emission shooting operation and a light emission shooting operation according to the number of non-light emission shooting operations. For example, as compared to when the number of non-light emission shooting operations is a first number, the control unit 102 may increase the exposure difference when the number of non-light emission shooting operations is a second number greater than the first number.

In step S220, the control unit 102 performs non-light emission shooting operations under the exposure condition determined in step S219. As described above, the control unit 102 may perform one, two, or more non-light emission shooting operations. The present exemplary embodiment deals with a case where the control unit 102 performs three non-light emission shooting operations in succession.

The control unit 102 temporarily stores a piece of light emission image data and three pieces of non-light emission image data obtained by successively performing the one light emission shooting operation and the three non-light emission shooting operations into the memory unit 109.

In step S221, the image combining unit 116 performs the image combining processing by using the one piece of light emission image data and the three pieces of non-light emission image data temporarily stored in the memory unit 109. The image combining unit 116 thereby generates composite image data. The image combining processing using the light emission image data and the non-light emission image data will be described below.

If the main light emission amount calculated in step S215 is not smaller than the minimum light emission amount (NO in step S216), then in step S222, the control unit 102 performs a light emission shooting operation under the exposure condition determined in step S211 and with the main light emission amount calculated in step S215.

In step S223, the control unit 102 determines an exposure condition for a non-light emission shooting operation based on the exposure condition determined in step S211. In step S223, like step S219, to obtain a non-light emission image with a bright background, the control unit 102 increases the capturing sensitivity for a non-light emission shooting operation as compared to the capturing sensitivity for a light emission shooting operation. More specifically, the control unit 102 makes a capturing sensitivity Sv3 for the non-light emission shooting operation relatively higher than the capturing sensitivity Svf for the light emission shooting operation. To obtain a favorable composite image without uncomfortable feeling, the other exposure control values for the non-light emission shooting operation, namely, an aperture value Av3 and a shutter speed Tv3 can be made the same as the aperture value Avf and the shutter speed Tvf for the light emission shooting operation. The control unit 102 may determine the exposure control values including the capturing sensitivity Sv3 according to a previously stored program diagram. The present exemplary embodiment deals with a case where the control unit 102 sets the aperture value Av3 to be the same as the aperture value Avf, sets the shutter speed Tv3 to be the same as the shutter speed Tvf, and sets the capturing sensitivity Sv3 to be one level higher than the capturing sensitivity Svf.

The control unit 102 may determine the difference between the capturing sensitivity Sv3 for the non-light emission shooting operation and the capturing sensitivity Svf for the light emission shooting operation based on a difference in noise between the light emission image data and the non-light emission image data. The capturing sensitivity Sv3 may be two or more levels higher if the difference in noise between the light emission image data and the non-light emission image data is small.

In step S224, the control unit 102 performs non-light emission shooting operations under the exposure condition determined in step S223. As described above, the control unit 102 may perform one, two, or more non-light emission shooting operations. The present exemplary embodiment deals with a case where the control unit 102 performs three non-light emission shooting operations in succession.

The control unit 102 temporarily stores a piece of light emission image data and three pieces of non-light emission image data acquired by successively performing the one light emission shooting operation and the three non-light emission shooting operations into the memory unit 109.

In step S225, the image combining unit 116 performs the image combining processing by using the one piece of light emission image data and the three pieces of non-light emission image data temporarily stored in the memory unit 109. The image combining unit 116 thereby generates composite image data.

As described above, the control unit 102 determines the exposure condition for the light emission shooting operation and the exposure condition for the non-light emission shooting operations based on information about the brightness of the object when the preliminary light emission is performed. This can suppress overexposure and underexposure in the light emission shooting operation. The control unit 102 can set an appropriate difference between the exposure conditions for the light emission shooting operation and the non-light emission shooting operations, whereby a favorable composite image can be obtained.

In steps S205 and S206, the control unit 102 performs the processing based on the brightness value calculated in step S203. Instead, the control unit 102 may acquire image data after the switch SW1 is turned on. In such a case, the control unit 102 calculates a brightness value based on the acquired image data, and uses the calculated brightness value for the processing.

In step S215, the control unit 102 calculates the reflected light amount of the preliminary light emission from the result of comparison between the non-light emission image data for light amount control and the preliminary light emission image data. If the effect of external light is small, the control unit 102 may calculate the reflected light amount of the preliminary light emission from only the preliminary light emission image data.

In step S215, the control unit 102 uses the average brightness value of blocks where the brightness values of the preliminary light emission image data and the non-light emission image data for light amount control vary by more than a predetermined amount. Instead, the control unit 102 may use a weighted average brightness value calculated by using different weights on respective blocks.

In step S216, the control unit 102 compares the calculated main light emission amount with the minimum light emission amount. However, the control unit 102 may compare the calculated main light emission amount with the maximum light emission amount. Suppose that the calculated main light emission amount is greater than the maximum light emission amount. In such a case, contrary to the case where the calculated main light emission amount is smaller than the minimum light emission amount, the brightness value of the main light emission image data becomes smaller than the appropriate brightness value as much as the light emission amount falls short. If the calculated main light emission amount is greater than the maximum light emission amount, the control unit 102 may determine new exposure control values based on the exposure control values determined in step S211 and the difference between the main light emission amount calculated in step S215 and the maximum light emission amount of the light emitting unit 110. For example, the control unit 102 may determine the exposure control values so that the average brightness value of blocks where the brightness values of the preliminary light emission image data and the non-light emission image data vary by more than a predetermined amount becomes the appropriate brightness value when the light emitting unit 110 emits light as much as a light emission amount smaller than the maximum light amount.

In step S219, the control unit 102 determines the exposure condition for a non-light emission shooting operation based on the exposure condition for a light emission shooting operation determined in step S217. However, the control unit 102 may determine the exposure condition for a non-light emission shooting operation based on the exposure condition determined in step S211, the preliminary light emission image data, and the non-light emission image data for light amount control. If the effect of external light is small as described above, the control unit 102 may determine the exposure condition for a non-light emission shooting operation based on the exposure condition determined in step S211 and the preliminary light emission image data.

Figure 7:
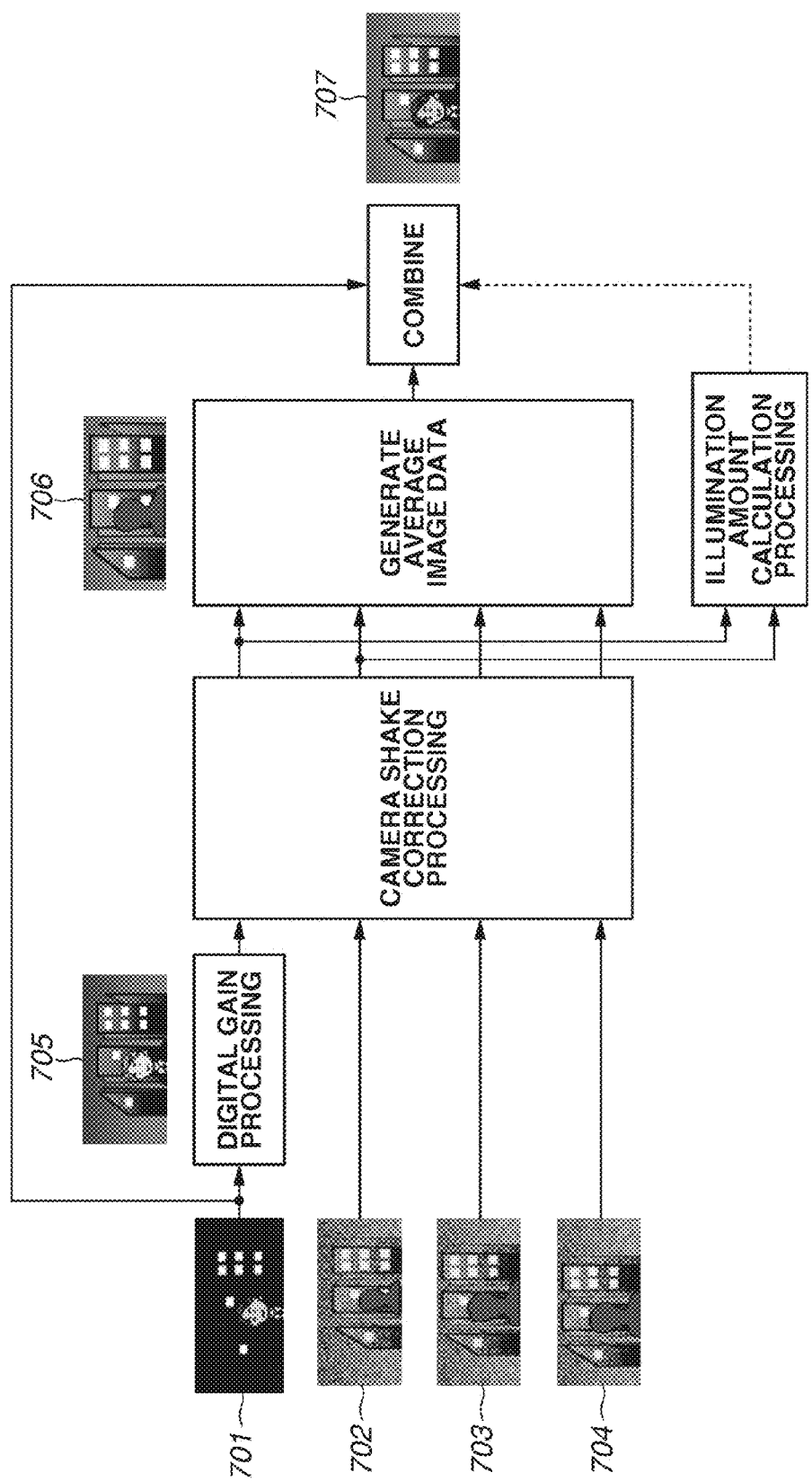
FIG. 7 is a diagram illustrating a relationship between pieces of image data and various types of processing in image combining processing.

Next, an example of the image combining processing performed in steps S221 and S225 will be described with reference to FIGS. 7 and 8. FIG. 7 is a diagram illustrating a relationship between the pieces of image data and processing to be performed in the image combining processing. To clarify differences between the pieces of image data, FIG. 7 illustrates images corresponding to the respective pieces of image data. FIG. 8 is a flowchart illustrating the processing related to the image combining processing. The image combining processing performed in steps S211 and S225 may be other than the method described in conjunction with FIGS. 7 and 8. Other conventional methods for obtaining a composite image based on light emission image data and non-light emission image data may be applied.

In step S801 of the image combining processing, the image processing unit 105 initially performs processing (hereinafter, referred to as "digital gain processing") for multiplying light emission image data (701 in FIG. 7) by a uniform gain amount G (digital gain amount). The image processing unit 105 temporarily stores the processed light emission image data (705 in FIG. 7) into the memory unit 109.

The control unit 102 determines the gain amount G used in step S801 to compensate a difference between the capturing sensitivity for a light emission shooting operation and the capturing sensitivity for a non-light emission shooting operation. The control unit 102 determines the gain amount G by using the following equation (1):

$$G = 2^{\wedge}\text{(the difference between the capturing sensitivity for a light emission shooting operation and the capturing sensitivity for a non-light emission shooting operation)} \quad (1)$$

In the present exemplary embodiment, the capturing sensitivity for a light emission shooting operation is set to be one level lower than that for a non-light emission shooting operation. According to equation (1), the gain amount G is 2. The person area of the light emission image data has the appropriate brightness value because of the light emission of the light emitting unit 110. After the digital gain processing, the person area thus has a brightness value greater than the appropriate brightness value. After the digital gain processing, the background area has approximately the same brightness value as that of the non-light emission image data because the difference in the capturing sensitivity is compensated.

In step S802, the image processing unit 105 performs development processing on each of the five pieces of image data (701 to 705 in FIG. 7) temporarily stored in the memory unit 109. The development processing includes white balance processing, color interpolation processing for converting a red, green, and blue (RGB) Bayer array signal into three RGB plane signals, gamma correction processing, saturation correction, and hue correction. The image processing unit 105 thereby generates YUV (Y: a luminance signal, U: a difference between the luminance signal and a blue component, and V: a difference between the luminance signal and a red component) image data, and temporarily stores the YUV image data into the memory unit 109. The application of the development processing to all the pieces of image data under the same condition facilitates determining differences between the pieces of image data. This facilitates the combining processing of the light emission image data and the non-light emission image data to be performed later. Note that four of the pieces of image data (701 to 704 in FIG. 7) temporarily stored in the memory unit 109 need not necessarily be subjected to the development processing in step S802. Each of such pieces of image data may be individually subjected to the development processing at the timing of acquisition. A piece or pieces of image data already undergone the development processing may be omitted from the development processing of step S802.

The image processing unit 105 performs the development processing of step S802 under the same condition regardless of whether on the light emission image data or the non-light emission image data. For example, the image processing unit 105 uses white balance correction coefficients in the white balance processing. For both the light emission image data and the non-light emission image data, the image processing unit 105 uses white balance correction coefficients such that the auxiliary light in the light emission image data becomes achromatic. This results in correct color tone of the person, the main object. Note that the white balance correction coefficients are not limited thereto, and any coefficients may be used.

In step S803, the image processing unit 105 performs correction (hereinafter, referred to as "camera shake correction") processing for correcting positional deviations occurring between the four pieces of image data (702 to 705 in FIG. 7). The image processing unit 105 performs the camera shake correction processing by detecting a positional deviation amount of positioning target image data with respect to positioning reference image data, and correcting the positioning target image data according to the detected positional deviation amount.

The present exemplary embodiment deals with a case where the light emission image data after the digital gain processing is used as the positioning reference image data, and the plurality of pieces of non-light emission image data acquired by the subsequent shooting operations as the positioning target image data.

One of the plurality of pieces of non-light emission image data may be used as the positioning reference image data, and the rest of the pieces of the non-light emission image data and the light emission image data may be used as the positioning target image data. The light emission shooting operation need not necessarily be performed first. Performing a light emission shooting operation first can facilitate catching a photo opportunity of the person, the main object.

The reason for the use of the light emission image data after the digital gain processing, not the light emission image data before the digital gain processing, is that a smaller difference between the brightness values of the positioning reference image data and the positioning target image data improves the positioning accuracy. The light emission image data includes an area or areas illuminated by the light emitting unit 110. Such areas can be excluded from the detection of the positional deviation amount because the areas have a large difference in the brightness value with respect to the same areas of the non-light emission image data.

In step S804, the image processing unit 105 calculates an average value of the light emission image data after the digital gain processing of step S801 and the non-light emission image data after the camera shake correction processing of step S803 pixel by pixel. The image processing unit 105 thereby generates average image data.

By averaging the plurality of pieces of image data, the image processing unit 105 can obtain low-noise image data without changing the brightness of the background. The present exemplary embodiment deals with a case where the image processing unit 105 averages not only the plurality of pieces of non-light emission image data but the light emission image data after the digital gain processing as well. Averaging not only the plurality of pieces of non-light emission image data but the light emission image data after the digital gain processing as well can further improve the noise reduction effect as compared to when only the plurality of pieces of non-light emission image data is averaged.

The average image data (706 in FIG. 7) generated in step S804 includes a background area of appropriate brightness and a person area of inappropriate brightness.

In step S805, the image processing unit 105 calculates the amount of illumination of the light emitting unit 110 (hereinafter, referred to as "illumination amount") in the light emission image data pixel by pixel. Such processing will hereinafter be referred to as illumination amount calculation processing.

In the illumination amount calculation processing of step S805, the image processing unit 105 initially applies a low-pass filter to the light emission image data after the digital gain processing and the non-light emission image data after the camera shake correction processing to obtain low-frequency image data. The application of the low-pass filter can reduce the effect of noise and improve a calculation accuracy of the illumination amount. The non-light emission image data to be filtered may be a piece of non-light emission image data that is acquired by the non-light emission shooting operation closest to the light emission shooting operation. In such a case, the effect of deviations of the person, the main object, can be minimized.

The image processing unit 105 calculates a difference (brightness difference) between the luminance signals Y of the two pieces of image data pixel by pixel. The magnitude of the brightness difference between the light emission image data and the non-light emission image data corresponds to the magnitude of the illumination amount. Since the light emission image data after the digital gain processing is used, the luminance signals Y of the light emission image data and the non-light emission image data generally coincide with each other in pixels not illustrated by the light emitting unit 110. The greater brightness difference a pixel has, the greater the illumination amount.

In the present exemplary embodiment, the image processing unit 105 calculates the illumination amount from a brightness difference between the two pieces of image data. The image processing unit 105 may calculate the illumination amount based further on differences in the color differences U and V.

The image processing unit 105 stores the calculated lamination amount of each pixel into the memory unit 109.

In step S806, the image combining unit 116 combines the light emission image data (701 in FIG. 7) before the digital gain processing with the average image data (706 in FIG. 6) generated in step S804 pixel by pixel at a combining ratio based on the illumination amount of each pixel calculated in step S805. The image combining unit 116 combines the image data based on equation (2):

$$\text{Combined signal} = \text{light emission image data} \times k + \text{average image data} \times (1-k) \quad (2)$$

wherein k ($0 \leq k \leq 1$) is the ratio of the light emission image data in the combining ratio. The greater the illumination amount, the higher the value of the ratio k. According to the illumination amount, the image combining unit 116 may change the ratio k stepwise rather than continuously. The image combining unit 116 may change the ratio k according to the illumination amount if the illumination amount is smaller than a predetermined value, and may set k=1 if the illumination amount is greater than or equal to the predetermined amount.

The image combining unit 116 thus ends the image combining processing of steps S221 and S225.

By performing the image combining processing as described above, the image processing unit 105 and the image combining unit 116 can obtain a favorable composite image by combining the image data acquired by performing a shooting operation while causing the light emitting unit 110 to emit light and the image data acquired by performing shooting operations without causing the light emitting unit 110 to emit light.

The exemplary embodiment of the present invention has been described above. The present invention is not limited to such an exemplary embodiment and may include designs falling within a range not departing from the gist of the present invention.

For example, the foregoing exemplary embodiment has dealt with the case where the camera 100 performs a light emission shooting operation by using the light emitting unit 110 built therein. However, the camera 100 may be configured to perform a light emission shooting operation by using a light emitting device detachably attached thereto.

The foregoing exemplary embodiment has dealt with the case where the user has selected the image combining photographing mode in advance. The camera 100 may have a function of determining a photographing scene based on the amount of movement and brightness of an object. In such a case, the camera 100 may automatically select the image combining photographing mode based on the result of scene determination.

The foregoing exemplary embodiment has dealt with the case where the control unit 102 starts exposing the image sensor 103 when the power switch is turned on. However, the control unit 102 may be configured to start exposing the image sensor 103 when an instruction to start a shooting operation is input. In such a case, the camera 100 may include a light metering sensor different from the image sensor 103. The control unit 102 can determine an exposure condition based on a result of light metering of the light metering sensor, which is information about the brightness of an object, instead of determining the exposure condition based on the image data output from the image processing unit 105.

The foregoing exemplary embodiment has dealt with the case where the image combining unit 116 of the camera 100 performs the image composition. In another possible configuration, the camera 100 may perform a plurality of shooting operations and transmit the acquired plurality of pieces of image data to an external apparatus, and the external apparatus may perform the image composition.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-201709 filed Sep. 13, 2012, which is hereby incorporated by reference herein in its entirety.

What is claimed is:

1. An imaging apparatus having a processor executing instructions in a memory, wherein the instruction causing the processor to function comprises:
    an imaging unit configured to capture an image of an object to output image data;
    an acquisition unit configured to acquire information about a brightness of the object;
    and a determination unit configured to determine an exposure control value to be used in a shooting operation based on the information acquired by the acquisition unit about the brightness of the object,
    wherein the imaging unit is configured to obtain a plurality of image data, for image combining processing, by performing a plurality of shooting operations including a light emission shooting operation, performed while causing a light emitting device to emit light, and a non-light emission shooting operation, performed without causing the light emitting device to emit light,
    wherein the determination unit is configured to determine exposure control values for the light emission shooting operation and the non-light emission shooting operation based on the information acquired by the acquisition unit about the brightness of the object from a preliminary light emission performed by the light emitting device,
    and wherein the determination unit is configured to determine the exposure control value for the light emission shooting operation before the light emission shooting operation is performed and determine the exposure control value for the non-light emission shooting operation before the non-light emission shooting operation is performed.

2. The imaging apparatus according to claim 1, the processor further comprising a calculation unit configured to calculate a main light emission amount of the light emitting device in the light emission shooting operation based on the information acquired by the acquisition unit about the brightness of the object when the preliminary light emission is performed by the light emitting device,
    wherein the determination unit is configured to determine the exposure control values for the light emission shooting operation and the non-light emission shooting operation based on the main light emission amount calculated by the calculation unit.

3. The imaging apparatus according to claim 2, wherein the determination unit is configured to, if the main light emission amount calculated by the calculation unit is smaller than a controllable minimum light emission amount of the light emitting device, determine the exposure control values for the light emission shooting operation and the non-light emission shooting operation based on the main light emission amount calculated by the calculation unit.

4. The imaging apparatus according to claim 2, wherein the determination unit is configured to, if the main light emission amount calculated by the calculation unit is smaller than a controllable minimum light emission amount of the light emitting device, determine the exposure control values for the light emission shooting operation and the non-light emission shooting operation based on a difference between the main light emission amount calculated by the calculation unit and the minimum light emission amount.

5. The imaging apparatus according to claim 1, wherein the determination unit is configured to, if the light emitting device is caused to emit light with a controllable minimum light emission amount of the light emitting device, determine the exposure control values of the light emission shooting operation and the non-light emission shooting operation based on the information acquired by the acquisition unit about the brightness of the object when the preliminary light emission is performed by the light emitting device.

6. The imaging apparatus according to claim 2, wherein the determination unit is configured to, if the main light emission amount calculated by the calculation unit is greater than a controllable maximum light emission amount of the light emitting device, determine the exposure control values for the light emission shooting operation and the non-light emission shooting operation based on the main light emission amount calculated by the calculation unit.

7. The imaging apparatus according to claim 2, wherein the determination unit is configured to, if the main light emission amount calculated by the calculation unit is greater than a controllable maximum light emission amount of the light emitting device, determine the exposure control values for the light emission shooting operation and the non-light emission shooting operation based on a difference between the main light emission amount calculated by the calculation unit and the maximum light emission amount.

8. The imaging apparatus according to claim 1, wherein the determination unit is configured to, if the light emitting device is caused to emit light with a controllable maximum light emission amount of the light emitting device, determine the exposure control values for the light emission shooting operation and the non-light emission shooting operation based on the information acquired by the acquisition unit about the brightness of the object when the light emitting device performs the preliminary light emission.

9. The imaging apparatus according to claim 1, wherein the determination unit is configured to determine the exposure control values for the light emission shooting operation and the non-light emission shooting operation based on the information acquired by the acquisition unit about the brightness of the object when the light emitting device performs the preliminary light emission and the information acquired by the acquisition unit about the brightness of the object when the light emitting device does not perform a preliminary light emission.

10. The imaging apparatus according to claim 1, wherein the determination unit is configured to determine the exposure control values for the light emission shooting operation and the non-light emission shooting operation so that exposure in the non-light emission shooting operation is brighter than exposure in the light emission shooting operation.

11. The imaging apparatus according to claim 10, wherein the plurality of shooting operations includes two or more non-light emission shooting operations, and
    wherein the determination unit is configured to determine the exposure control values for the light emission shooting operation and the non-light emission shooting operations thereby to produce an exposure difference based on the number of non-light emission shooting operations in the plurality of shooting operations.

12. The imaging apparatus according to claim 11, wherein the determination unit is configure to determine the exposure control values for the light emission shooting operation and the non-light emission shooting operations so that the exposure difference, when the number of non-light emission shooting operations is a second number greater than a first number, is greater than the exposure difference when the number of non-light emission shooting operations is the first number.

13. The imaging apparatus according to claim 1, wherein the determination unit is configured to set a capturing sensitivity for the one or more non-light emission shooting operations to be higher than that for the light emission shooting operation.

14. The imaging apparatus according to claim 1, the processor further comprising an image combining unit configured to perform the image combining processing based the plurality of image data output from the imaging unit as a result of the plurality of shooting operations.

15. The imaging apparatus according to claim 1, wherein the determination unit is configured to determine the exposure control value for the light emission shooting operation based on the information acquired by the acquisition unit about the brightness of the object when the light emitting device performs the preliminary light emission, and to determine the exposure control value for the non-light emission shooting operation based on the determined exposure control value for the light emission shooting operation.

16. A method for controlling an imaging apparatus including an imaging unit configured to capture an image of an object to output image data, the method comprising:
 acquiring information about a brightness of the object;
 determining an exposure control value to be used in a shooting operation based on the acquired information about the brightness of the object;
 obtaining a plurality of image data, to be used for image combining processing, by performing a plurality of shooting operations including a light emission shooting operation, performed while causing a light emitting device to emit light, and a non-light emission shooting operation, performed without causing the light emission device to emit light; and
 determining exposure control values for the light emission shooting operation and the non-light emission shooting operation based on the acquired information about the brightness of the object when a preliminary light emission is performed by the light emitting device, and
 determining the exposure control value for the light emission shooting operation before performing the light emission shooting operation, and
 determining the exposure control value for the non-light emission shooting operation before performing the non-light emission shooting operation.

* * * * *